United States Patent
Akaishi et al.

(10) Patent No.: US 11,015,064 B2
(45) Date of Patent: May 25, 2021

(54) ANTIFOULING STRUCTURE PRECURSOR, ANTIFOULING STRUCTURE, AND SURFACE MODIFICATION METHOD

(71) Applicant: NISSAN MOTOR CO., LTD., Yokohama (JP)

(72) Inventors: Shinichi Akaishi, Kanagawa (JP); Yoshiko Tsukada, Kanagawa (JP); Masanobu Sugimoto, Kanagawa (JP); Daijirou Sakurai, Kanagawa (JP); Yuji Noguchi, Kanagawa (JP); Ryota Kobayashi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/747,799

(22) Filed: Jan. 21, 2020

(65) Prior Publication Data
US 2020/0157356 A1 May 21, 2020

Related U.S. Application Data

(62) Division of application No. 16/317,737, filed as application No. PCT/JP2017/017391 on May 8, 2017, now abandoned.

(30) Foreign Application Priority Data

Jul. 15, 2016 (JP) .................. 2016-140162

(51) Int. Cl.
*B05D 3/00* (2006.01)
*C09D 5/00* (2006.01)
(Continued)

(52) U.S. Cl.
CPC ............... *C09D 5/00* (2013.01); *B05D 3/00* (2013.01); *B05D 5/00* (2013.01); *B05D 7/24* (2013.01); *B32B 3/00* (2013.01); *B32B 7/02* (2013.01); *B32B 27/28* (2013.01); *C03C 17/30* (2013.01); *C03C 17/32* (2013.01); *C09D 5/16* (2013.01);
(Continued)

(58) Field of Classification Search
None
See application file for complete search history.

(56) References Cited

U.S. PATENT DOCUMENTS 6,200,684 B1 3/2001 Yamaguchi et al.
6,958,191 B2 10/2005 Yamaguchi et al.
(Continued)

FOREIGN PATENT DOCUMENTS

CN 101628980 A 1/2010
CN 104364294 A 2/2015
(Continued)

*Primary Examiner* — Robert S Loewe
(74) *Attorney, Agent, or Firm* — Foley & Lardner LLP (57) ABSTRACT

An antifouling structure precursor, comprising: a modification layer that contains a modifier having a perfluoropolyether chain; and an oxide layer that has a surface entirely covered with the modification layer, wherein the modification layer has an uneven film thickness and comprises a comparatively thick area and a comparatively thin area that is dispersed in the comparatively thick area, and a coverage rate of covering the oxide layer with the comparatively thick area is equal to or greater than 10%. An antifouling structure, comprising: an antifouling structure precursor; and a lubricant oil on a surface of the antifouling structure precursor.

8 Claims, 3 Drawing Sheets

(51) Int. Cl.
    *C03C 17/32*    (2006.01)
    *C09D 183/14*   (2006.01)
    *C03C 17/30*    (2006.01)
    *C09D 171/02*   (2006.01)
    *C09D 5/16*     (2006.01)
    *B05D 5/00*     (2006.01)
    *B32B 7/02*     (2019.01)
    *B05D 7/24*     (2006.01)
    *B32B 3/00*     (2006.01)
    *C09K 3/18*     (2006.01)
    *B32B 27/28*    (2006.01)
    *C09K 3/00*     (2006.01)
    *C09D 183/12*   (2006.01)

(52) U.S. Cl.
    CPC ......... *C09D 171/02* (2013.01); *C09D 183/12* (2013.01); *C09D 183/14* (2013.01); *C09K 3/00* (2013.01); *C09K 3/18* (2013.01); *C03C 2217/70* (2013.01)

(56) References Cited

U.S. PATENT DOCUMENTS

| | | | |
|---|---|---|---|
| 6,977,307 | B2 | 12/2005 | Dams |
| 7,294,731 | B1 | 11/2007 | Flynn et al. |
| 7,794,843 | B2 | 9/2010 | Yamane et al. |
| 8,592,498 | B2 | 11/2013 | Enomura |
| 9,567,468 | B1 | 2/2017 | Liu |
| 2003/0139620 | A1 | 7/2003 | Yamaguchi et al. |
| 2012/0107623 | A1 | 5/2012 | Nagashima et al. |
| 2012/0237777 | A1 | 9/2012 | Lu |
| 2014/0147680 | A1 | 5/2014 | Yamane et al. |
| 2015/0337161 | A1 | 11/2015 | Haraguchi et al. |
| 2016/0200917 | A1 | 7/2016 | Yin et al. |
| 2016/0200941 | A1 | 7/2016 | Liu et al. |
| 2016/0229875 | A1 | 8/2016 | Qiu et al. |
| 2017/0044315 | A1 | 2/2017 | Mitsuhashi et al. |

FOREIGN PATENT DOCUMENTS

| | | |
|---|---|---|
| CN | 105263967 A | 1/2016 |
| JP | H10-120445 A | 5/1998 |
| JP | 2003-113244 A | 4/2003 |
| JP | 2015-066849 A | 4/2015 |
| JP | 2015-066850 A | 4/2015 |
| JP | 5835512 B | 11/2015 |
| WO | WO-2012/149085 A1 | 11/2012 |
| WO | WO-2015/026652 A1 | 2/2015 |
| WO | WO-2015/155830 A1 | 10/2015 |
| WO | WO-2016/110456 A1 | 7/2016 |

ANTIFOULING STRUCTURE PRECURSOR, ANTIFOULING STRUCTURE, AND SURFACE MODIFICATION METHOD

CROSS REFERENCE TO RELATED APPLICATIONS

This application is a divisional application of U.S. application Ser. No. 16/317,737, filed on Jan. 14, 2019, which is the National Stage of Application No. PCT/JP2017/017391 filed on May 8, 2017, which is based upon and claims the benefit of priority from Japanese Application No. 2016-140162, filed on Jul. 15, 2016, the entire contents of all of which are incorporated herein by reference.

TECHNICAL FIELD

The present invention relates to an antifouling structure precursor, an antifouling structure, a surface modification composition and a surface modification method. In more detail, the present invention relates to an antifouling structure precursor and an antifouling structure that can be produced by a simple process and to a surface modification composition for producing the antifouling structure precursor and a surface modification method.

BACKGROUND ART

It has been known to treat the surface of a base material such as glass or plastic with a surface treatment agent to impart water repellency, oil repellency and antifouling property.

For example, Patent Document 1 discloses that a surface treatment agent that contains a silane compound having a specific perfluoro (poly) ether group can form a layer that has high surface slipperiness and high abrasion resistance as well as water repellency, oil repellency, antifouling property and waterproofing property.

CITATION LIST

Patent Document

Patent Document 1: JP 5835512 B

SUMMARY OF INVENTION

Technical Problem

However, the surface modification of Patent Document 1 is achieved by vapor deposition, which is not a simple process and requires large equipment.

The present invention has been made in view of the problem in the prior art, and an object thereof is to provide a surface modification method that enables forming an antifouling structure on a base material with low heat resistance, such as resin, by a simple process.

Solution to Problem

As a result of a keen study for achieving the above-described object, the present inventors have found that an antifouling structure precursor can be produced in an environment at ordinary temperature and ordinary pressure in a short time by modifying the surface of an oxide layer with a surface modification composition that concurrently contains a modification accelerator for accelerating hydrolysis and a modification accelerator for accelerating dehydration condensation. The present invention has been thus completed.

That is, the surface modification method of the present invention involves producing a surface modification composition and applying the surface modification composition to the surface of an oxide layer.

In producing the surface modification composition, a modifier having a perfluoropolyether chain is mixed with a first modification accelerator containing an inorganic acid, and a second modification accelerator containing at least one selected from the group consisting of a metal, a metal salt, and an organometallic compound.

The surface modification composition of the present invention concurrently contains: a modifier having a perfluoropolyether chain; and a first modification accelerator containing an inorganic acid; and a second modification accelerator containing at least one selected from the group consisting of a metal, a metal salt and an organometallic compound.

A surface modification composition set of the present invention is a combination of the above-descried modifier, the above-described first modification accelerator and the above-described second modification accelerator.

The antifouling structure precursor of the present invention includes: an oxide layer; and a modification layer containing a modifier having a perfluoropolyether chain that covers an entire surface of the oxide layer.

The modification layer is derived from a surface modification composition simultaneously including a modifier having a perfluoropolyether chain, a first modification accelerator containing an inorganic acid, and a second modification accelerator containing at least one selected from the group consisting of a metal, a metal salt and an organometallic compound, has an uneven film thickness and includes a comparatively thick area and a comparatively thin area that is dispersed in the comparatively thick area, a coverage rate of covering the oxide layer with the comparatively thick area is equal to or greater than 10%, the comparatively thick area is an area having a cohesion of 3.11 nN or more, and the cohesion is measured by vertically moving a scanner of an atomic force microscope (AFM) on a surface of the antifouling structure precursor to obtain a force curve and quantitatively evaluating cohesion acting between a probe and a specimen from the force curve.

The antifouling structure of the present invention includes the above-described antifouling structure precursor that is impregnated with a lubricant oil.

Advantageous Effects of Invention

In the present invention, the surface of the oxide layer is modified with the surface modification composition that concurrently contains the modification accelerator for accelerating hydrolysis and the modification accelerator for accelerating dehydration condensation. Therefore, it is possible to provide the surface modification method that enables producing the antifouling structure precursor at ordinary temperature and ordinary pressure in a short time.

DESCRIPTION OF EMBODIMENTS

Surface Modification Composition

The surface modification composition of the present invention concurrently contains a modifier, a first modification accelerator and a second modification accelerator. It may further contain water, if necessary.

The modifier contains a compound having a perfluoropolyether chain. Examples of such modifiers include silane coupling agents known in the art that have a hydrolysable group capable of binding to an oxide such as alkoxy group or ester group.

The first modification accelerator contains a hydrolysis catalyst that mainly accelerates hydrolysis of the modifier.

Such hydrolysis catalysts include inorganic acids, and such inorganic acids include phosphoric acid, diphosphoric acid, polyphosphoric acid, sulfuric acid, sulfurous acid, hydrochloric acid, nitric acid, boric acid and the like.

The second modification accelerator contains a dehydration condensation catalyst that mainly accelerates dehydration condensation of the modifier. Such dehydration condensation catalysts include metal catalysts, metal salts, organometallic compounds and the like.

Specific examples of such catalysts include metal catalysts such as platinum and rhodium, metal carboxylates such as zinc octoate, tin octoate, cobalt octoate and tin oleate, dibutyltin dilaurate, dibutyltin dioctoate, dibutyltin diacetate, and hydrosilylation catalysts such as Pt/1,3-divinyltetramethyldisiloxane complex and hexachloroplatinic (IV) acid.

The first modification accelerator and the second modification accelerator may be added in a so-called catalytic amount. For example, depending on the type of modifier used, the concentration of the first modification accelerator or the second modification accelerator in the surface modification composition is within the range of 1.0 ppm to 20%.

The modifier produces silanol (Si—OH) as a result of hydrolysis, and the silanol causes dehydration condensation to form a siloxane bond to polymerize the modifier itself while the silanol also causes dehydration condensation with a hydroxyl group on the surface of an oxide so as to modify the surface of the oxide.

The surface modification composition concurrently contains the first modification accelerator and the second modification accelerator, and they do not act as a catalytic poison of each other while accelerating the hydrolysis reaction and the dehydration catalytic reaction of the modifier. Therefore, it is possible to modify the surface of an oxide at ordinary temperature in a short time only by applying the composition and drying it.

Further, the surface modification composition can impart good antifouling property even to the surface of an oxide layer that is formed on a base material with low heat resistance such as resin.

A modification layer formed by the surface modification composition has uneven film thickness. That is, it forms a comparatively thick area and a comparatively thin area.

It has not been revealed yet why the surface modification composition forms such an uneven modification layer. However, it is suggested as follows.

Since the surface modification composition concurrently contains the first modification accelerator that accelerates hydrolysis of the modifier and the second modification accelerator that accelerates dehydration condensation of the modifier, the modifier is polymerized by the hydrolysis reaction to have wider molecular weight distribution before applying the surface modification composition onto the oxide layer.

Then, the application onto the oxide layer causes dehydration condensation reaction, and the surface of the oxide layer is coated by various sizes of the modifier with different molecular weights. As a result, the high-molecular-weight modifier forms the thick area while the low-molecular-weight modifier forms the thin area.

When the surface modification composition contains water, it can promote the hydrolysis reaction to polymerize the modifier in a short time. However, hydrolysis of the modifier is also caused by water in the air.

The amount of water added in the surface modification composition is preferably less than ten times the weight of modifier. When water is added in the amount of ten times or more of the weight of the modifier, it inhibits the dehydration condensation reaction, and the surface of the oxide cannot be sufficiently covered.

Surface Modification Composition Set

Since the surface modification composition contains the first modification accelerator that promotes hydrolysis of the modifier to cause polymerization, the modifier sometime precipitates when the surface modification composition is stored for a long time.

However, the composition can be stored for a long time as the surface modification composition set in which the modifier, the first modification accelerator and the second modification accelerator are stored individually in separate containers.

Surface Modification Method

The above-described surface treatment method, which modifies the surface of the oxide layer to decrease the surface free energy of the oxide layer so as to improve the affinity for lubricant oil, involves producing a surface modification composition and applying the surface modification composition.

In producing the surface modification composition, the surface modification composition is produced from the surface modification composition set, i.e. the modifier is mixed with the first modification accelerator and the second modification accelerator. When mixing the modifier, the first modification accelerator and the second modification accelerator, water may be further mixed at the same time in order to promote the hydrolysis reaction.

Alternatively, the surface modification composition may be produced and stored in a sealed container so that hydrolysis is not caused by water in the air, and water may be added before use. Adding water after producing the surface modification composition and before applying the surface modification composition onto the surface of the oxide layer can prevent development of the hydrolysis reaction.

In applying the surface modification composition, the surface modification composition is applied onto the surface of the oxide layer.

A coating method known in the art may be employed. Examples of such methods include, for example, spin coating, spraying, roll coating, flow coating, dip coating and the like.

The surface modification composition is applied onto the surface of the oxide layer preferably after the elapse of preferably 15 minutes or more, more preferably 2 hours or more from the production of the surface modification composition. Just after the production of the surface modification composition, the modifier has not been sufficiently polymerized yet. Since the thick area is not sufficiently formed, the surface free energy of the antifouling structure precursor may not sometimes be decreased.

The modifier may sometimes precipitate when the surface modification composition is stored for a long period of time. e.g. several months or more after the production. To avoid this, it is preferred that the surface modification composition is applied within 1 month from the production.

The surface modification composition of the present invention that concurrently contain the first modification accelerator and the second modification accelerator can modify the surface of the oxide layer at an ordinary temperature of, for example, from 20° C. to 30° C. In terms of accelerating the hydrolysis, it is preferred that the modification layer is formed in an environment at a humidity of 40% RH or more.

Antifouling Structure Precursor

The antifouling structure precursor of the present invention will be described in detail.

The antifouling structure precursor includes the modification layer that has low surface free energy and high affinity for lubricant oil. The antifouling structure precursor becomes the antifouling structure by being impregnated with lubricant oil to form a smooth water-repellent surface.

Figure 1:
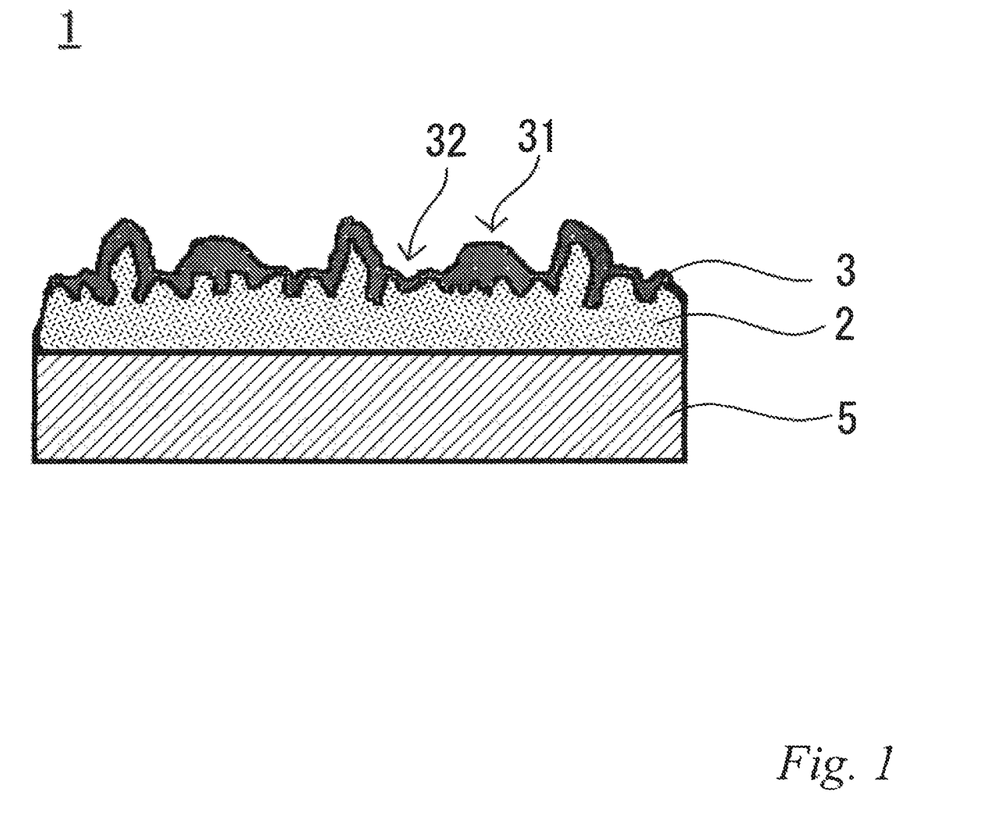
FIG. 1 is a schematic cross-sectional view of an example of the antifouling structure precursor of the present invention.

FIG. 1 is a schematic cross-sectional view of the antifouling structure precursor of the present invention.

As illustrated in FIG. 1, the antifouling structure precursor 1 includes the oxide layer 2 and the modification layer 3 that contains the modifier having a perfluoropolyether chain. The entire surface of the oxide layer 2 is covered with the modification layer 3. Since the entire surface of the oxide layer 2 is covered with the modification layer 3, the entire surface of the antifouling structure precursor 1 is wet with lubricant oil. Therefore, dirt is not pinned but slides off.

The modification layer 3 includes the comparatively thick area 31 and the comparatively thin area 32. The comparatively thin area is dispersed in the comparatively thick area, and the coverage rate of covering the oxide layer with the comparatively thick area 31 is equal to or greater than 10%.

When the coverage rate of covering the oxide layer with the comparatively thick area 31 is equal to or greater than 10%, the antifouling structure precursor has sufficiently decreased surface free energy and exhibits stable antifouling performance.

It is preferred that the coverage rate of covering the oxide layer with the thick area 31 is within the range of 10% to 99%, more preferably from 20% to 90%, yet more preferably 50% to 90%.

When the coverage rate is within the above-described range while the oxide layer 2 has a smooth surface, the modification layer with uneven film thickness forms an uneven pattern on the surface of the antifouling structure precursor. Since lubricant oil is likely to be held in recesses, this improves the retention in combination with the high affinity of the modification layer for lubricant oil.

When the oxide layer 2 has an uneven surface, the low-molecular-weight modifier is likely to penetrate into recesses of the oxide layer 2 while the high-molecular-weight modifier modifies protrusions of the oxide layer 2. As a result, a larger uneven pattern is formed on the surface of the antifouling structure precursor. This further improves the retention of lubricant oil.

The coverage rate of covering the oxide layer with the thick area can be measured with an atomic force microscope (AFM) by obtaining a shape image (uneven pattern image) of the surface of the antifouling structure precursor along with a signal representing the physical property of the surface at the same time and mapping the thick area based on an analyzed phase image.

Since the modification layer has different cohesive forces between the thick area and the thin area, the phase difference between vibration (AC voltage) applied to an AFM probe and the vibration of a cantilever changes. The film thickness of the modification layer can be evaluated by mapping the phase difference, and the coverage rate of covering the oxide layer with the thick area can thus be measured.

The oxide layer is made of an inorganic oxide and has a hydroxyl group in the surface. Examples of such layers include inorganic glass coating formed on a resin-coated surface, glass, metal oxides and the like.

Such inorganic glass coating can be formed by applying a solution of polysilazane such as perhydropolysilazane (PHPS) onto a resin-coated surface and drying it.

It is preferred that the oxide layer has an uneven surface. When the oxide layer has an uneven surface, a larger uneven pattern is formed on the surface of the antifouling structure precursor. This can improve the retention of lubricant oil.

The antifouling structure precursor can be formed by applying the surface modification composition of the present invention onto the surface of the oxide layer and drying it.

Antifouling Structure

Figure 2:
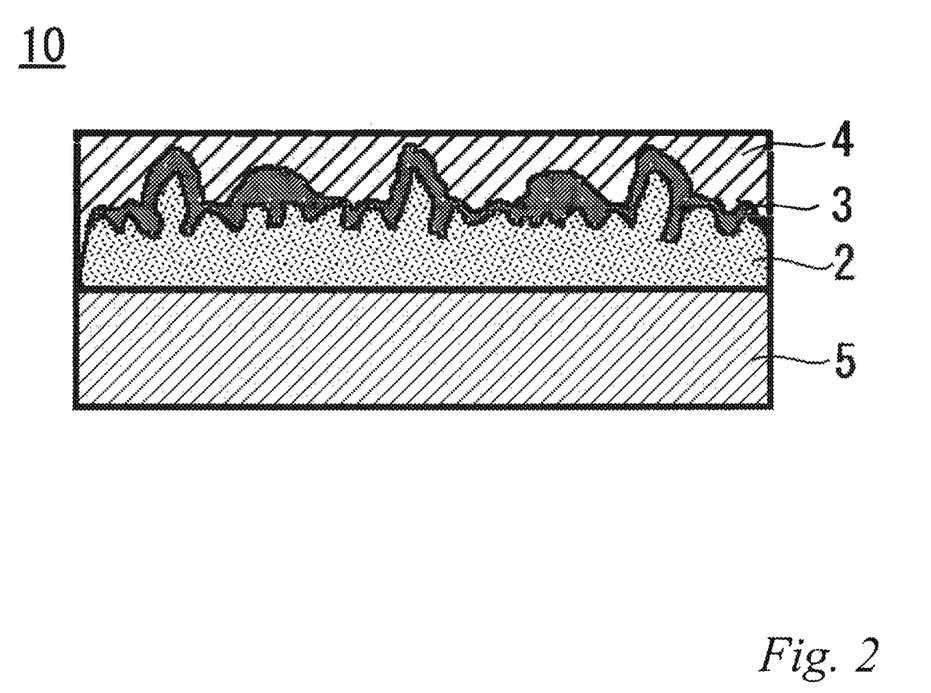
FIG. 2 is a schematic cross-sectional view of an example of the antifouling structure of the present invention.

As illustrated in FIG. 2, the antifouling structure 10 of the present invention includes the antifouling structure precursor 1 that is impregnated with lubricant oil 4.

The lubricant oil 4 forms the smooth surface of the antifouling structure precursor 1 to repel foreign matters such as water, oil, sand and dust so as to reduce adhesion of such foreign matters.

Lubricant oils that can be used include non-volatile lubricant oils having low surface energy such as fluorinated oils and silicone oils.

Such fluorinated oils include fluoropolyether oils, perfluoropolyether oils and the like.

Such silicone oils include straight-chain or cyclic silicone oils.

Examples of straight-chain silicone oils include so-called straight silicone oils and modified silicone oils. Examples of straight silicone oils include dimethyl silicone oil, methylphenyl silicone oil, methylhydrogen silicone oil and the like.

Examples of modified silicone oils include straight silicone oils that are modified with polyethers, higher fatty acid esters, fluoroalkyls, amino, epoxy, carboxyl, alcohols. Examples of cyclic silicone oils include cyclic dimethylsiloxane oil and the like.

EXAMPLES

Hereinafter, the present invention will be described in detail with examples. However, the present invention is not limited to the following examples.

Comparative Example 1

Production of Surface Modification Composition

A surface modification composition was produced by mixing 10 mL of a modifier having a perfluoropolyether chain (FLUOROSURF FG-5020TH-0.1, Harves Co., Ltd.) with 2.5 µL of alkoxysilane containing 20% of phosphoric acid as the first modification accelerator and 666 µL of an isopropyl alcohol solution containing 3 ppm of an organic platinum catalyst (Pt/1,3-divinyltetramethyldisiloxane complex) as the second modification accelerator.

Production of Modification Layer

The surface modification composition was applied onto a smooth glass surface by using a cotton, and the applied composition was kept in an environment at 25° C. and 50% RH for 1 hour to form the modification layer. An antifouling structure precursor was thus obtained.

Production of Antifouling Structure

A fluorinated oil (KRYTOX GPL103, DuPont Co.) (0.25 mL) was put on the surface of the antifouling structure precursor dropwise. The oil was spread by using a cotton and allowed to stand for 5 minutes so that the antifouling structure precursor was impregnated with the oil. Thereafter, excess fluorinated oil was wiped off with a cloth until no rainbow pattern was observed. An antifouling structure was thus produced.

Example 1

Production of Oxide Layer

The surface of urethane resin coating was degreased with isopropyl alcohol. Thereafter, a solution of perhydropolysilazane (TRESMAIL ANP140-01, Sanwa Kagaku Corp.) was applied onto the surface of the urethane resin coating by using a cloth impregnated with the solution and then dried. An oxide layer having an uneven surface was thus formed.

An antifouling structure was produced in the same manner as Comparative example 1 except that the above-described surface modification composition was applied onto the surface of this oxide layer by flow coating, and the applied composition was kept in an environment at 25° C. and 70% RH for 1 hour to form the modification layer.

Example 2

An antifouling structure was produced in the same manner as Example 1 except that the surface modification composition was used 2 hours after the production.

Example 3

An antifouling structure was produced in the same manner as Example 1 except that the surface modification composition was used 6 hours after the production.

Comparative Example 2

A surface modification composition was produced by mixing 10 mL of the modifier having a perfluoropolyether chain (FLUOROSURF FG-5020TH-0.1, Fluorotechnology, Co.) with 3.9 µL of the first modification accelerator containing 20% of sulfuric acid and 666 µL of the second modification accelerator containing 3 ppm of organic platinum catalyst (Pt/1,3-divinyltetramethyldisiloxane complex).

An antifouling structure was produced in the same manner as Comparative example 1 except that this surface modification composition was used.

Comparative Example 3

An antifouling structure was produced in the same manner as Comparative example 1 except that water was added to the surface modification composition in the amount of 80% of the weight of the modifier having a perfluoropolyether chain.

Comparative Example 4

An antifouling structure was produced in the same manner as Example 1 except that the modifier having a perfluoropolyether chain (FLUOROSURF FG-5020TH-0.1) was applied onto the surface of the oxide layer by flow coating and was kept in an environment at 45° C. and 70% RH for 24 hours to form the modification layer.

Comparative Example 5

An antifouling structure was produced in the same manner as Example 1 except that the modifier having a perfluoropolyether chain (FLUOROSURF FG-5020TH-0.1) was applied onto the surface of the oxide layer by flow coating and was kept in an environment at 25° C. and 70% RH for 1 hour to form the modification layer.

Comparative Example 6

An antifouling structure was produced in the same manner as Comparative example 1 except that the modifier having a perfluoropolyether chain (FLUOROSURF FG-5020TH-0.1) was applied onto the glass surface by using a cotton and was kept in an environment at 25° C. and 50% RH for 1 hour to form the modification layer.

Comparative Example 7

Production of Surface Modification Composition

A surface modification composition was produced by mixing 10 mL of the modifier having a perfluoropolyether chain (FLUOROSURF FG-5020TH-0.1) with 2.5 µL of the first modification accelerator containing 20% of phosphoric acid.

An antifouling structure was obtained in the same manner as Example 1 except that this surface modification composition was used.

Comparative Example 8

Production of Surface Modification Composition

A surface modification composition was produced by mixing 10 mL of the modifier having a perfluoropolyether chain (FLUOROSURF FG-5020TH-0.1) with 666 µL of the second modification accelerator containing 3 ppm of an organic platinum catalyst (Pt/1,3-divinyltetramethyldisiloxane complex).

An antifouling structure was obtained in the same manner as Comparative example 1 except that this surface modification composition was used.

Comparative Example 9

Production of Surface Modification Composition

A surface modification composition was produced by mixing 10 mL of the modifier having a perfluoropolyether chain (FLUOROSURF FG-5020TH-0.1) with 8.2 µL of the first modification accelerator containing 10% of acetic acid and 666 µL of the second modification accelerator containing 3 ppm of an organic platinum catalyst (Pt/1,3-divinyltetramethyldisiloxane complex).

An antifouling structure was obtained in the same manner as Comparative example 1 except that this surface modification composition was used.

Evaluation

The antifouling structure precursors and the antifouling structures of Examples and Comparative examples were evaluated by the following methods. The evaluation results are shown in Table 1.

Coverage Ratio of Thick Area

The surface condition of the antifouling structure precursors was evaluated as follows. A scanner of an atomic force microscope (AFM) was vertically moved in the following conditions to obtain a force curve. The cohesion between a probe and a specimen was quantitatively evaluated from the force curve and mapped as described below. The coverage rate of covering the oxide layer with the thick area was measured, and it was confirmed that the oxide layer is not exposed.

Pretreatment: Each specimen was fixed by the magnetic force of a magnet sheet so that it was electrically grounded.

Device name: NANOSCOPE IIIa (Bruker AXS Co.)+ D3100

Probe: Si single crystal probe (OMCL-AC160TS, Olympus Co.)

Measuring conditions: The AFM force curve method (contact mode) with a lamp length of 1 μm and a lamp speed of 0.2 Hz was employed. The force curve in a 20×20 μm square was measured with a tapping mode AFM, and the maximum cohesion was determined in an attraction force section in a reverse scan.

Image processing: A phase image was subjected to (primary) Flatten processing. The phase image was further subjected to Gaussian processing (moving average of 500 nm). Data processing: (Primary) drift correction between forward scan and reverse scan.

Thick area: cohesion of from 3.11 Fmax/nN to below 15.50 Fmax/nN;

Thin area: cohesion of from 0.12 Fmax/nN to below 3.11 Fmax/nN;

Oxide layer-exposed area: cohesion of 15.50 Fmax/nN or more.

Figure 3:
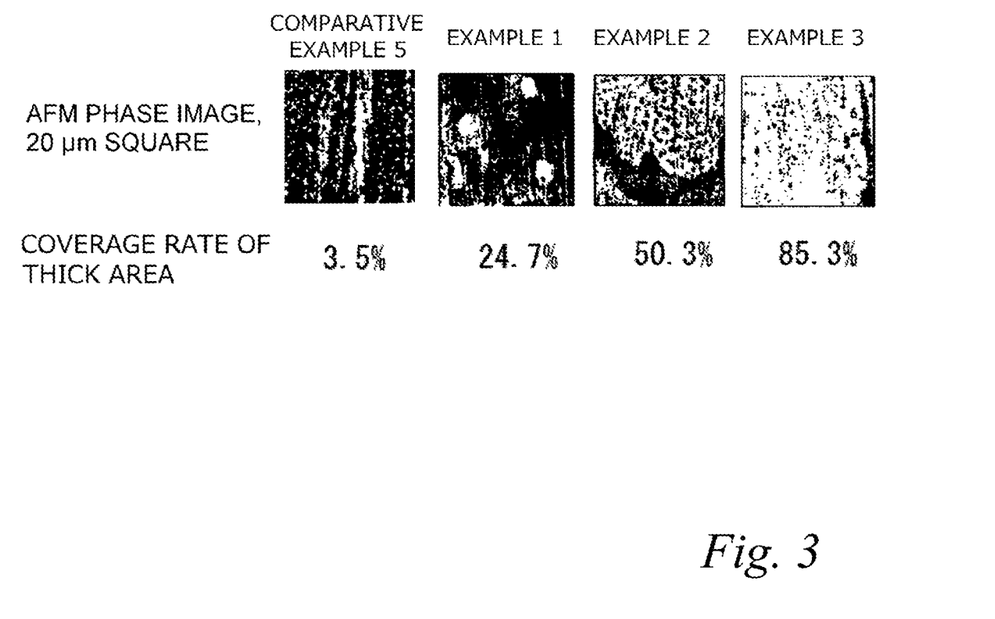
FIG. 3 is AFM phase images of examples and a comparative example.

AFM phase images of Example 1 to Example 3 and Comparative example 5 are shown in FIG. 3. In FIG. 3, white portions correspond to the thick area.

Measurement of Surface Free Energy

The surface free energy of the antifouling structure precursors was calculated from the contact angle of a 5 μL ethanol droplet that was measured with an automatic contact meter (DSA 100).

Measurement of Sliding Angle

The sliding angle of a 20 μL pure water on the antifouling structures was measured with an automatic contact meter (DSA100).

TABLE 1

|  | Oxide layer | First modification accelerator | Second modification accelerator | Water |
|---|---|---|---|---|
| Comparative example 1 | Glass | Phosphoric acid | Organic Pt | None |
| Example 1 | Silazane coating | Phosphoric acid | Organic Pt | None |
| Example 2 | Silazane coating | Phosphoric acid | Organic Pt | None |
| Example 3 | Silazane coating | Phosphoric acid | Organic Pt | None |
| Comparative example 2 | Glass | Sulfuric acid | Organic Pt | None |
| Comparative example 3 | Glass | Phosphoric acid | Organic Pt | Added |
| Comparative example 4 | Silazane coating | None | None | None |
| Comparative example 5 | Silazane coating | None | None | None |
| Comparative example 6 | Glass | None | None | None |
| Comparative example 7 | Silazane coating | Phosphoric acid | None | None |
| Comparative example 8 | Glass | None | Organic Pt | None |
| Comparative example 9 | Glass | Acetic acid | Organic Pt | None |

|  | Duration of Time until use | Modification conditions | Coverage rate | Surface free energy (mJ/m$^2$) | Sliding angle |
|---|---|---|---|---|---|
| Comparative example 1 | — | 25° C. 50% RH, 1 h | — | 12.8 | — |
| Example 1 | — | 25° C. 70% RH, 1 h | 24.7% | 13.5 | 10.7° |
| Example 2 | 2 hours | 25° C. 70% RH, 1 h | 50.3% | 13.5 | 9° |
| Example 3 | 6 hours | 25° C. 70% RH, 1 h | 85.3% | 12.7 | 9.5 |
| Comparative example 2 | — | 25° C. 50% RH, 1 h | — | 13.4 | — |
| Comparative example 3 | — | 25° C. 50% RH, 1 h | — | 13.2 | — |
| Comparative example 4 | — | 45° C. 70% RH, 24 h | 6.5% | 13.14 | 8.8° |
| Comparative example 5 | — | 25° C. 70% RH, 1 h | 3.5% | 13.61 | — |
| Comparative example 6 | — | 25° C. 50% RH, 1 h | — | 20.3 | — |
| Comparative example 7 | — | 25° C. 70% RH, 1 h | — | 14.33 | 15.2° |
| Comparative example 8 | — | 25° C. 50% RH, 1 h | — | 15.4 | — |
| Comparative example 9 | — | 25° C. 50% RH, 1 h | — | 16 | — |

The antifouling structure precursors of Comparative example 1 to Comparative example 3 were not able to hold lubricant oil, and a water droplet did not slide off. This was because the period of time from the production of the surface modification composition to the application thereof was short, and an uneven pattern that can hold lubricant oil was not formed on the smooth glass surface.

The antifouling structure of Comparative example 4 exhibited sufficient antifouling property since the modification was performed over a long time. However, since the thick area of the film of the modification layer was small, the retention property of lubricant oil was poor.

The antifouling structure of Comparative example 5 had insufficient antifouling property, and dirt was pinned. This was because the surface modification composition contained no modification accelerator, and the oxide layer was not completely coated.

The antifouling structure precursor of Comparative example 9 did not have sufficiently decreased surface free energy since acetic acid was used as the first modification accelerator.

REFERENCE SIGNS LIST

1 Antifouling structure precursor
2 Oxide layer
3 Modification Layer
31 Thick area
32 Thin area
4 Lubricant oil
5 Resin coating
10 Antifouling structure

The invention claimed is:

1. A surface modification method for modifying a surface of an oxide, the method comprising:
   producing a surface modification composition; and
   applying the surface modification composition onto a surface of an oxide layer,
   wherein in producing the surface modification composition, a modifier having a perfluoropolyether chain is mixed with:
      a first modification accelerator containing a phosphoric acid; and
      a second modification accelerator containing an organic platinum catalyst.

2. The surface modification method according to claim 1, wherein the surface modification composition is applied onto the surface of the oxide layer after an elapse of predetermined time from production of the surface modification composition.

3. The surface modification method according to claim 1, wherein in producing the surface modification composition, the modifier having a perfluoropolyether chain is further mixed with water at the same time.

4. The surface modification method according to claim 1, further comprising: adding water to the surface modification composition after producing the surface modification composition and before applying the surface modification composition onto the surface of the oxide layer.

5. The surface modification method according to claim 1, wherein applying the surface modification composition onto the surface of the oxide layer comprises applying a silazane coating onto the surface of the oxide layer.

6. An antifouling structure precursor, comprising:
   a modification layer that contains a modifier having a perfluoropolyether chain; and
   an oxide layer that has a surface entirely covered with the modification layer,
   wherein the modification layer is derived from a surface modification composition simultaneously including:
      a modifier having a perfluoropolyether chain;
      a first modification accelerator containing an inorganic acid; and
      a second modification accelerator containing at least one selected from the group consisting of a metal, a metal salt or an organometallic compound,
   the modification layer has an uneven film thickness and comprises a comparatively thick area and a comparatively thin area that is dispersed in the comparatively thick area,
   a coverage rate of covering the oxide layer with the comparatively thick area is equal to or greater than 10%,
   the comparatively thick area is an area having a cohesion of 3.11 nN or more, and
   the cohesion is measured by vertically moving a scanner of an atomic force microscope (AFM) on a surface of the antifouling structure precursor to obtain a force curve and quantitatively evaluating cohesion acting between a probe and a specimen from the force curve.

7. The antifouling structure precursor according to claim 6, wherein the comparatively thick area has the coverage rate within a range from 24.7% to 85.3%.

8. The antifouling structure precursor according to claim 6 comprising a lubricant oil on the surface of the antifouling structure precursor.

* * * * *